United States Patent
Maes et al.

(10) Patent No.: US 9,923,952 B2
(45) Date of Patent: Mar. 20, 2018

(54) CLOUD APPLICATION DEPLOYMENT

(75) Inventors: Stephane H. Maes, Fremont Alameda, CA (US); Rajeev Bharadhwaj, Saratoga, CA (US); Travis S Tripp, Fort Collins, CO (US); Kevin Lee Wilson, Fort Collins, CO (US); Petr Fiedler, Uvaly (CZ); John M Green, Rocklin, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 381 days.

(21) Appl. No.: 14/402,653

(22) PCT Filed: Jun. 8, 2012

(86) PCT No.: PCT/US2012/041625
§ 371 (c)(1),
(2), (4) Date: Nov. 20, 2014

(87) PCT Pub. No.: WO2013/184134
PCT Pub. Date: Dec. 12, 2013

(65) Prior Publication Data
US 2015/0163288 A1  Jun. 11, 2015

(51) Int. Cl.
*G06F 15/16* (2006.01)
*H04L 29/08* (2006.01)
*H04L 29/06* (2006.01)
*G06F 9/50* (2006.01)

(52) U.S. Cl.
CPC ............ *H04L 67/10* (2013.01); *G06F 9/5072* (2013.01); *H04L 67/42* (2013.01)

(58) Field of Classification Search
CPC ........ H04L 67/10; H04L 67/42; G06F 9/5072
USPC ................................ 709/203, 201, 223, 224
See application file for complete search history.

(56) References Cited

U.S. PATENT DOCUMENTS

| 8,209,415 | B2* | 6/2012 | Wei | H04L 41/0896 709/224 |
|---|---|---|---|---|
| 9,626,271 | B2* | 4/2017 | Karpuram | G06F 8/665 |
| 9,674,372 | B2* | 6/2017 | Karnas | H04M 15/8061 |
| 2006/0112383 | A1 | 5/2006 | Chang et al. | |
| 2008/0072217 | A1* | 3/2008 | Li | G06F 8/71 717/170 |
| 2009/0276771 | A1* | 11/2009 | Nickolov | G06F 9/4856 717/177 |
| 2011/0145392 | A1 | 6/2011 | Dawmspm et al. | |

(Continued)

OTHER PUBLICATIONS

Endo, P.T., et al., Resource Allocation for Distributed Cloud: Concepts and Research Challenges, IEEE Network, IEEE Service Center, vol. 25, No. 4, Jul. 1, 2011, pp. 42-46.

(Continued)

*Primary Examiner* — Thu Ha Nguyen
(74) *Attorney, Agent, or Firm* — Tong, Rea, Bentley & Kim, LLC

(57) ABSTRACT

A system (100) includes an application model (140) to characterize a given application (110) for deployment on a cloud (130). A deployment manager (120) analyzes an application requirement for the given application (110) based on the application model (140) and policies (150) associated with the given application (110) to substantially match infrastructure resources (160) in the cloud (130) to fulfill the application requirement.

17 Claims, 6 Drawing Sheets

(56) References Cited

U.S. PATENT DOCUMENTS

| | | | |
|---|---|---|---|
| 2011/0231552 A1 | 9/2011 | Carter et al. | |
| 2011/0231822 A1* | 9/2011 | Sabin | G06F 11/3688 717/124 |
| 2011/0288692 A1* | 11/2011 | Scott | G06F 21/55 700/297 |
| 2012/0066670 A1 | 3/2012 | McCarthy et al. | |
| 2012/0102486 A1* | 4/2012 | Yendluri | G06F 9/5072 717/177 |
| 2012/0117560 A1 | 5/2012 | Vorthmann et al. | |
| 2012/0131193 A1 | 5/2012 | Ferris et al. | |
| 2012/0159517 A1 | 6/2012 | Shen et al. | |
| 2014/0040473 A1* | 2/2014 | Ho | G06F 9/5072 709/226 |
| 2014/0123129 A1* | 5/2014 | Risbood | G06F 9/4433 717/176 |
| 2014/0189684 A1* | 7/2014 | Zaslaysky | G06F 9/45533 718/1 |
| 2014/0280595 A1* | 9/2014 | Mani | H04L 12/1827 709/204 |
| 2014/0330881 A1* | 11/2014 | Stone | H04L 67/10 709/201 |
| 2015/0074278 A1* | 3/2015 | Maes | H04L 47/70 709/226 |
| 2015/0100684 A1* | 4/2015 | Maes | G06F 11/3672 709/224 |
| 2015/0163288 A1* | 6/2015 | Maes | H04L 67/10 709/203 |
| 2015/0180949 A1* | 6/2015 | Maes | H04L 43/10 709/201 |
| 2015/0199197 A1* | 7/2015 | Maes | G06F 8/71 717/122 |
| 2015/0295844 A1* | 10/2015 | Perreira | G06F 9/4843 709/226 |
| 2015/0304175 A1* | 10/2015 | Maes | G06F 8/70 709/226 |
| 2016/0139910 A1* | 5/2016 | Ramanathan | G06F 8/65 717/170 |
| 2016/0350102 A1* | 12/2016 | Karpuram | G06F 8/665 |
| 2017/0076057 A1* | 3/2017 | Burton | G06F 19/3418 |
| 2017/0123709 A1* | 5/2017 | Kotadia | G06F 3/0638 |
| 2017/0171245 A1* | 6/2017 | Lee | H04L 63/20 |
| 2017/0257432 A1* | 9/2017 | Fu | G06F 9/5072 |

OTHER PUBLICATIONS

Supplementary European Search Report, European Patent Application No. 12878465.9, dated Feb. 29, 2016, 10 pages.

Alexander Lenk, et al., Requirements for an IaaS Deployment Language in Federated Clouds, IEEExplore-IEEE org., Dec. 12-14, 2011, Karlsruhe, Germany.

Korean Intellectual Property Office, International Search Report and Written Opinion, dated Aug. 30, 2013, 11 pages, Daejeon Metropolitan City, Republic of Korea.

Stuart Charlton, Model-Driven Design and Operations for the Cloud, position paper of the Oopsla 2009 Workshop, 2009, pp. 1-10, San Francisco, CA.

\* cited by examiner

CLOUD APPLICATION DEPLOYMENT

BACKGROUND

Cloud computing refers to the delivery of scalable and pooled computing, storage and networking capacity as a service to a network of end-recipients. The name comes from the use of clouds as an abstraction for the complex infrastructure of networks and associated hardware operative within the cloud. Cloud computing provides services for a user's data, software and computation over a network, for example. Such computing capability relies on sharing of resources to achieve coherence and economies of scale similar to a utility (like the electricity grid) over a network (typically the Internet). Applications deployed on resources supporting the cloud presently often have to be manually deployed and that consumes considerable administrative time. The manual steps of deploying the application include the provisioning and instantiation of the infrastructure. This requires linking the installation of the application or deployment of an image to the full knowledge of the deployed infrastructure. Manual deployment typically requires numerous sequences of steps usually launched by the user who attempts to deploy the application.

DETAILED DESCRIPTION

Figure 1:
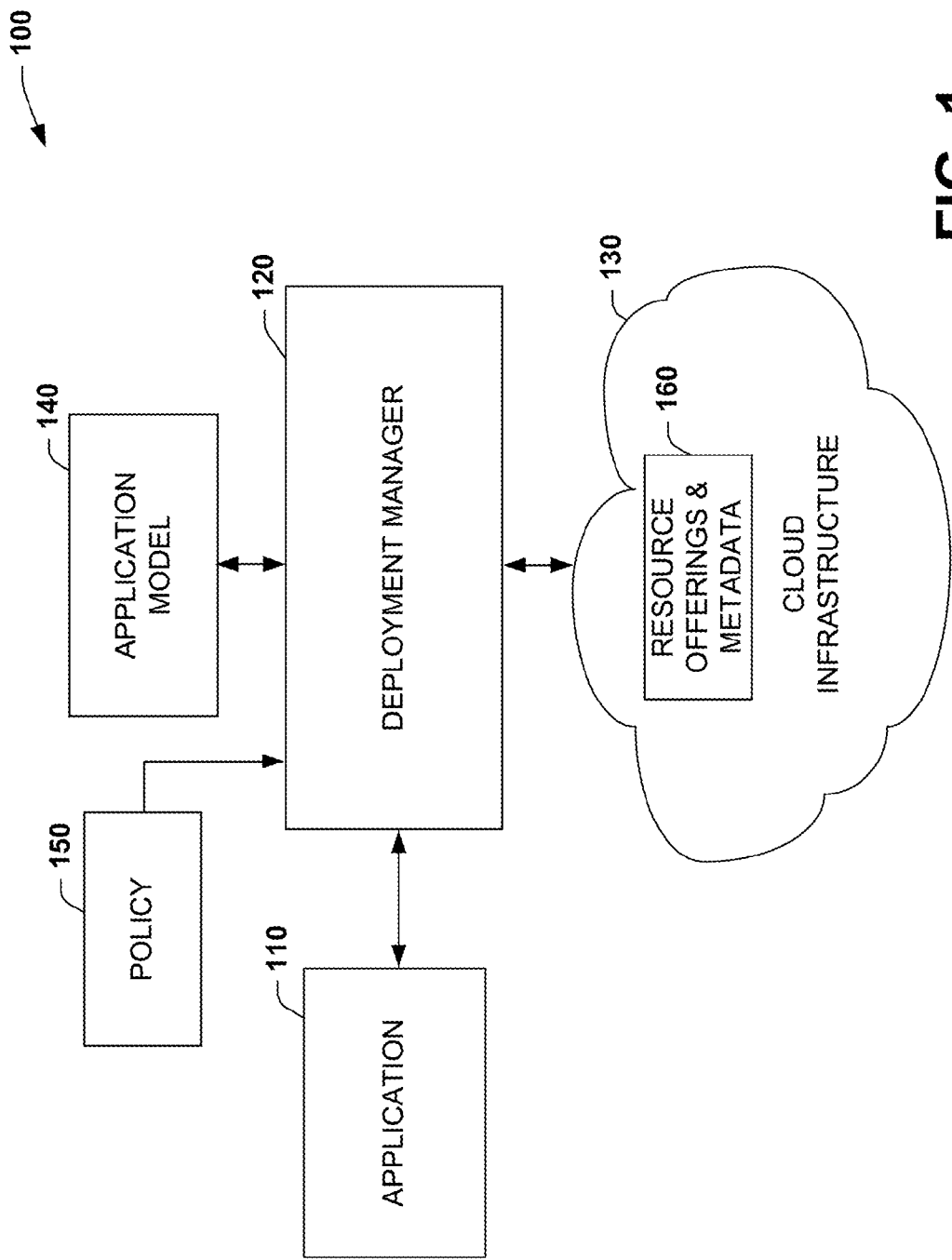
FIG. 1 illustrates an example of a system that provides automated deployment for cloud applications.

FIG. 1 illustrates an example of a system 100 that facilitates automated deployment for cloud applications. The system 100 can provide automated deployment of an application 110 by utilizing a deployment manager 120 to determine infrastructure capabilities of a cloud infrastructure 130 (also referred to as cloud 130) and also determining application requirements of the application 110 by analyzing an application model 140 and policy 150. After such determinations, the deployment manager 120 can automatically manage the lifecycle of the application 110 on the cloud 130, wherein matches are identified (e.g., ideal or best effort). Based on a measure of closeness in the matching, and/or other policy requirements a match is selected and the infrastructure can be provisioned/instantiated. After such absolute or best effort matching of resources to application requirements, then the components of the application 110 can be deployed on the cloud 130.

When an application has been deployed based on the matching, the deployment manager 120 further can manage other aspects of the lifecycle of the application. For example, the deployment manager 120 can monitor feedback, and adjust the infrastructure resources based on such feedback. Additionally or alternatively, the deployment manager 120 can dynamically adjust the application model and corresponding policies based on such feedback or other detected events. Similarly, this can also include retiring older versions of application components (e.g., code, middleware (MW), databases, operating system (OS), and so forth) and installing new versions of components to enable continued deployment of the application in the cloud infrastructure 130.

The cloud 130 can be a hybrid such that it can be a combination of traditional Data Centers that are made to behave like infrastructure resources, private clouds (cloud technology developed on premise), public clouds (offered by service providers and managed cloud configurations (managed on premise or in a public cloud/virtual private cloud). As used herein, the term application applies to a collection of components. In addition, the application can be characterized for each of its components by a set of artifacts (e.g., installer, executable, configurations and so forth, and a set of components that are installed and interact with each other (e.g., code, middleware (MW), databases, operating system (OS), and so forth). Also, as used herein, the term determining can include compiling, enumerating, and matching.

As used herein, the term "substantially" is intended to indicate that while the function or results of the term being modified are a desired or intended result that some variation can result. In this context, for example, the term "substantially match" describes a situation that the resulting analysis and comparison is performed to identify resources that are the same; however, in practice the match can correspond to a set of resources that sufficiently similar to enable deployment. Where more than one such set of resources might correspond to a match, the deployment manager can select a best matching set of available resources. Other approaches for selecting such match can be utilized.

The application model 140 can be employed to characterize a given application 110 for deployment on the cloud 130, such as though metadata descriptions for various components of the application. The deployment manager 120 can be implemented via instructions executable or data readable by a processor to analyze an application requirement for the given application 110 based on the application model 140 and a policy 150 (or policies) associated with the given application. As will be described below, the policy 150 can be provided to describe additional operating context for the application 110 (e.g., operate application after midnight, use only east coast servers, maintain load balancing between servers, deploy within a given network domain, ensure load is between specified limits on servers, ensure there are no upcoming maintenances within a given window, and so forth as well techniques to "measure closeness" of the matches). The deployment manager 120 can then determine infrastructure resources in the cloud 130 sufficient to fulfill the application requirement of the application 110 as specified by the model 140 and policy 150.

Infrastructure capabilities of the cloud 130 can be determined via resource offerings and metadata 160 associated with the cloud. For instance, a plurality of service providers supporting the cloud 130 can provide files that specify what types of resources they have available and metadata that describe properties of interest for the respective resource offerings (e.g., resource offering of three servers available with metadata specifying memory size and processor speeds, load (if already instantiated), location, tenancy terms, service level agreements (SLAs), scheduled maintenances, and so forth).

In one example, the deployment manager 120 can automatically deploy the given application 110 on the cloud 130 after the matching of application requirements of the application 110 to the capabilities of the cloud as specified by the resource offerings and metadata 160. In this type of example, it usually amounts to executing the instructions of other following examples described below (possibly by calling external systems that manage the lifecycle of the infrastructure and/or of the applications). As noted previously, the term application 110 can include a set of components that are to be installed and executed (e.g., multiple tiered logic, user interface (UI), middleware (MW), database (DB), operating system (OS) in addition to the code to install and configure such components). Thus, the application 110 refers to these sets of components and artifacts which can also include repositories of such components and artifacts. The application can also be identified by pointers to the components and artifacts including individual pointers or pointers to a set of components. In another example, the deployment manager 120 can generate instructions to inform a system (or user) on how to deploy the given application 110 on the cloud 130. In either example, the deployment manager 120 automatically correlates requirements of the application 110 as specified by the model 140 and policy 150 with capabilities of the cloud 130 as specified by the resource offerings and metadata 160.

The system 100 utilizes a policy and model-driven approach to automate deployment as opposed to manual procedures of conventional systems. The system 100 can dynamically (or statically) optimize and bind infrastructure resources (characterized by metadata properties) to applications 110 based on models 140 and policies 150 that characterize their requirements in terms of infrastructure properties. This can include matching application metadata to resource metadata as well as taking into account policies and context to automate optimized or preferred/labeled deployment of applications and their components/dependencies on the cloud 130 without also requiring manual deployment steps. In one example, the system 100 allows tracking of instances while also supporting automated management of such instances (e.g., automated monitoring and feedback described below). Different techniques are provided to ingest, author, and design metadata that can also describe infrastructure templates, application models, and policies. Such instances can be stored in a database or repository (not shown) along with the application 110, application model 140, and policy 150.

The system 100 can employ closed feedback loops (See FIG. 4) for monitoring applications. Such monitoring applications can be based on policy such as to scale up or scale down an application execution requirement, for example, as well as to notify appropriate recipients, such as users or system applications. In one example, listeners can be installed in various components to capture events from monitoring. Events received by listeners can trigger handlers that can generate lifecycle management operations on the system (e.g., scale up, scale down, move, de-provision, alert user or system, run another executable that may involve composition of the systems described herein and other applications, and so forth).

The system 100 can be implemented on one or multiple hardware platforms, wherein the modules in the system can be executed on one or across multiple platforms. Such modules can run on cloud technology (various forms/and hybrid clouds) or offered as a SaaS (Software as a service) that can be implemented on or off the cloud. Complex applications can be automatically deployed on required infrastructure without also requiring users to understand how to perform such operations. Policies 150 provide automated instructions for operating guidelines that help administrators mitigate deployment errors. Metadata can also be associated with the application by identifying the type of application (e.g., via UI or API), then the user does not need to understand the application characteristics. This approach allows "best practice", recommended or imposed deployment models for applications based on their association to metadata. Policies also allow separating the application characteristics from other contextual considerations (e.g., about user, about application, about infrastructure, about context, about that specific user, about that specific application, and so forth. This facilitates the reuse of the application models across numerous applications. Particularization can also be achieved via policies. This is also how for example the system impose that a specific set of characteristic values are fixed for a given application or version. For example, the system could apply a generic application model for web applications, yet in another case, explicitly specify a different model or certain values for the attributes of the model. Resources can also be provided from hybrid clouds (e.g., some resources provided from local databases and servers and some resources provided from Internet services).

For purposes of simplification of explanation, in the example of FIG. 1, different components of the system 100 are illustrated and described as performing different functions. However, one of ordinary skill in the art will understand and appreciate that the functions of the described components can be performed by different components, and the functionality of several components can be combined and executed on a single component. The components can be implemented, for example, computer executable instructions, hardware (e.g., an application specific integrated circuit or a processing unit), or as a combination of both. In other examples, the components could be distributing among remote devices across a network. In one example, topologies can be defined where an applications template can include a topology model of which application components should be deployed (e.g., what component to be deployed at which location in the cloud) for a given application. As a further example, the deployment manager 120 could be provided with a topology model for a given application (e.g., comprising various infrastructure resources) and then determine the infrastructure resources in the cloud that substantially match the topology model instantiated for the given application. In another example, after provisioning of the resources and deployment of the application components for a given application, then a topology instance can be created for the given application. The topology instance can be stored and used for later management, monitoring, as disclosed herein.

Figure 2:
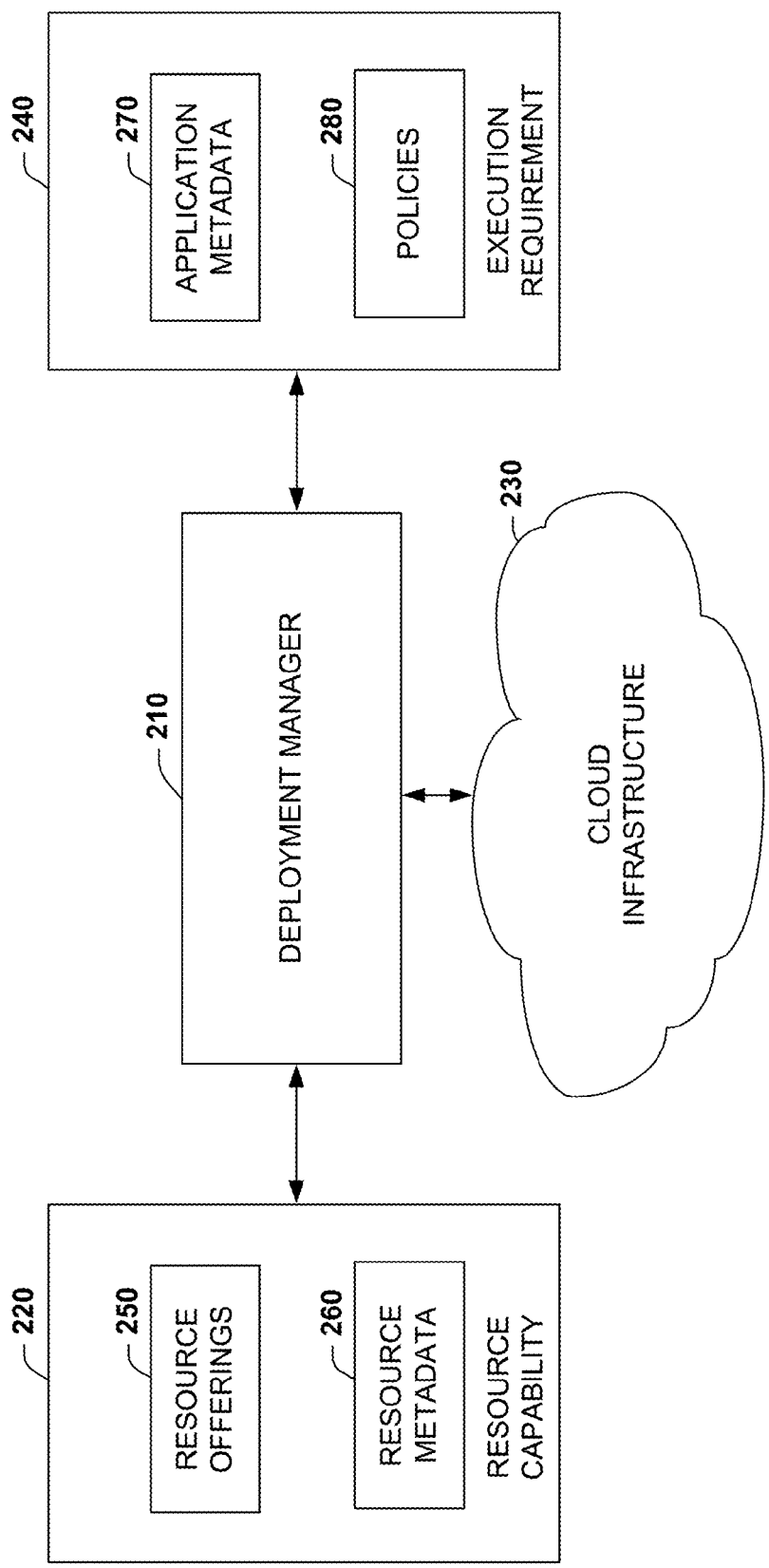
FIG. 2 illustrates an example of a deployment manager for correlating a resource capability for a cloud infrastructure with an execution requirement of an application.

FIG. 2 illustrates an example of a deployment manager 210 for correlating a resource capability 220 for a cloud 230 with an execution requirement 240 of an application. The resource capabilities 220 can include resource offerings 250 that can be from a pool of resource offerings provided by a plurality of resource providers that support the cloud 230. Such resource offerings can include one or more of cloud services (e.g., accessible via corresponding application program interfaces (APIs)), existing systems that can activate and provision such services, or existing external compositions (parameterized workflow/composition script with functions calls), for example. The resource offerings 250 can be compiled by/ingested from resource providers. The resource capability 220 also includes resource metadata 260 associated to each resource offering that characterize properties of interest of the resource. For example, such metadata 260 can specify location/topologies (e.g., for composite resources), hardware, CPU, memory, operating system included or supported, other software aspects, and labels among other specifications, capacities, SLAs, scheduled maintenances, workload (if already in partial use). The resource metadata 260 can be associated to any resource designed or added to the resource pool by the resource design or ingestion process. Metadata describing the applications models and resource offerings can be captured via a designer (e.g., a tool, Portal UI or APIs) to describe the metadata. Metadata including recipes (e.g., corresponding to instructions for deployment and other lifecycle management functions such as un-deployment and monitoring) can constitute resource templates. The resource metadata 260 and the associated resource offerings 250 that is specified by the metadata can be provided as part of a template (e.g., data file of metadata and offerings) that can be utilized by other applications.

The execution requirement 240 of the given application can be specified via application metadata 270 that can be defined at or after application design. This can include components to be individually deployed (e.g., multiple applications in multiple tiers). The application metadata 260 can also specify requirements/preferences on resources. This can include generic deployment scripts as workflow or processes (asynchronous or synchronous). The deployment scripts can further include deployment instructions for each component (e.g., script to run on allocated resource, instruction to services, and so forth). This can include associated instructions to deploy agents or prepare for monitoring and/or management. Instructions can be applied across components. In general, the application metadata 270 can represent the application models described above with respect to FIG. 1. A given application model can be stored in memory and utilized by multiple applications to facilitate deployment thereof. As noted previously, an application can include a plurality of cooperating components and artifacts (e.g., sources or executable and installable) provided with the applications that are utilized by the deployment scripts.

As shown, additional policies 280 can be provided that apply to the application/Infrastructure and refer to context for operating an application. For example, a policy may specify a location for an application (e.g., only operate on east coast servers), a time (e.g., operate after midnight and before 6:00 AM), a processing requirement (e.g., processing speed and memory needs specified), and/or a load balancing requirement (e.g., no server is to operate with over 50% load), SLAs, availability requirements (e.g. no scheduled maintenance within next x days etc), security (e.g. a particular network domain or security domain).

Applications can be deployed by the deployment manager 210 by retrieving the associated metadata 270 and matching resource offerings 250 available in the pool of resources based on best match (can be exact labeling if for example imposed by policies). Matching of resource metadata 260 to application metadata 270 can be according to strict specifications (e.g., processors must operate at 1 GHZ) or can be matched according to threshold specification (e.g., any processor operating over 500 MHZ is acceptable). Thus, matching can be absolute matching or can be substantial matching where the matching is best fit or close to the desired match criteria. Recipes can be processed by the deployment manager 210 and refer to the code/artifact to use for application deployments. Such recipes can be made available via a known repository location or referred to via a pointer to the recipe, for example. Topologies of composite resources that correspond to an application can be saved as a new resource type by the deployment manager 210 for reuse when similar application metadata is used by another application, for example. Multiple releases of the same applications or similar applications can reuse the same application metadata but, for example, with different policies to relate to operating context.

Figure 3:
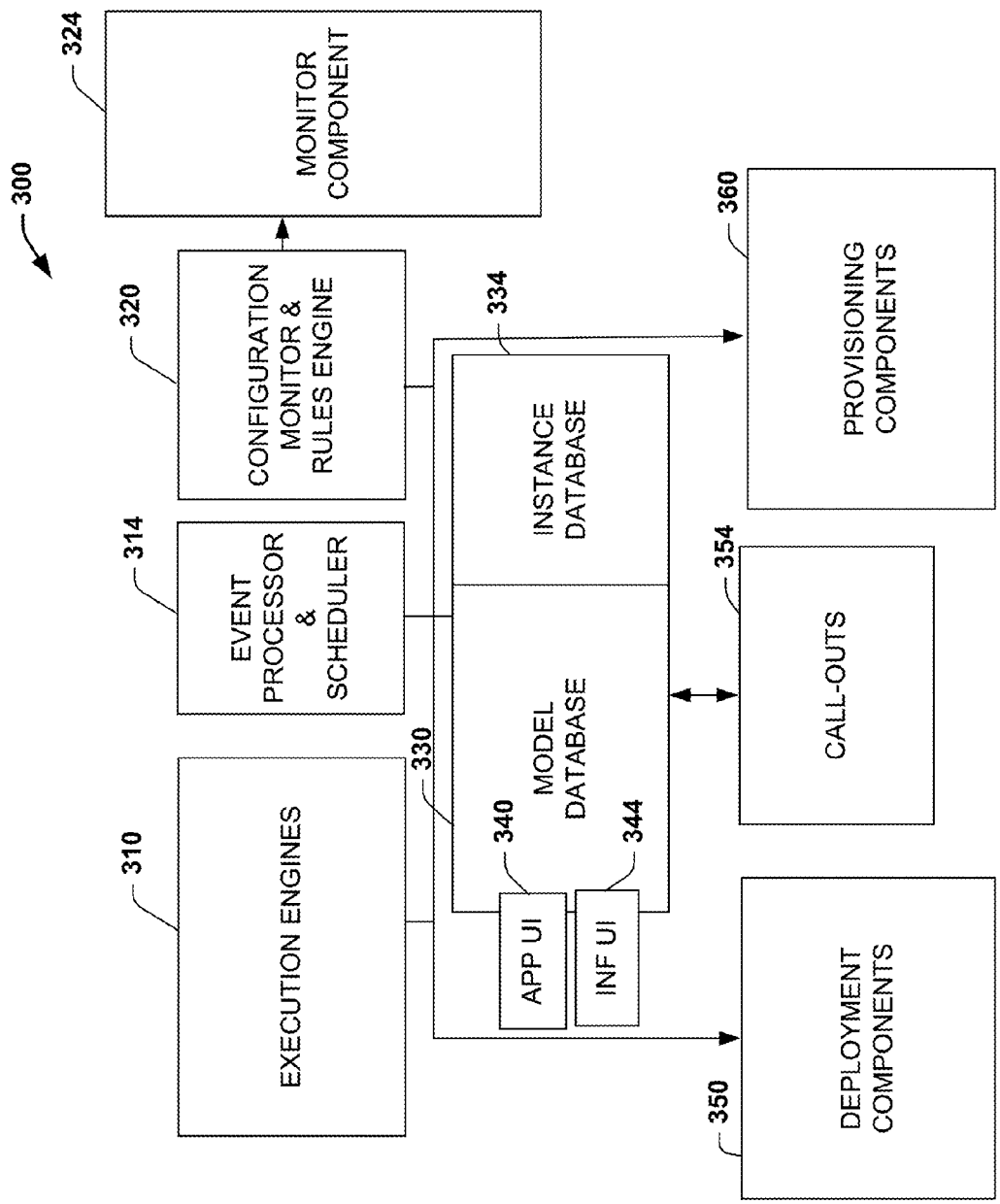
FIG. 3 illustrates an example system for automated deployment and monitoring of applications.

FIG. 3 illustrates an example system 300 for automated deployment and monitoring of applications. The system 300 includes execution engines 310 for automated deployment of applications. Such engines can also include provisioning managers for establishing service level agreements with service providers and can include the deployment manager described above. An event processor and scheduler can 314 can be utilized for processing application events and scheduling tasks associated with the application. As noted previously, listeners/handlers can be defined and installed for monitoring events. This can include scheduling the provisioning/deployment and follow-up lifecycle management operations (e.g. tonight or deploy for next 2 weeks). A configuration monitor 320 and rules engine can be employed for configuring a monitor component 324 which provides feedback from an application and for applying rules and policies for executing the application. The system 300 includes a model database 330 that can include application models, infrastructure models, and artifact pointers, for example. An instance database 334 can be employed to store realized target instances of the application. An application user interface 340 can be employed to design the application and configure metadata for operating the application, whereas an infrastructure user interface 244 can be employed to specify infrastructure requirements. Deployment components 350 can include a deployment application programming interface (API) and instructions such as may be specified via a deployment recipe, for example. One or more call-outs 354 can specify customized operating instructions for a given application. Provisioning components 360 can include a provisioning API and plug-ins for interacting with various cloud infrastructure components.

The system 300 can be utilized as a designer tool to build/deploy infrastructure and application templates. It also allows application developers, testers, or other administrators or designers to build application models. Similarly, they can design policies and rules for execution and deployment. Some or all of the infrastructure and application data can be ingested into the repositories shown as database 330 and 340, respectively. Alternatively, such infrastructure or application data can be passed via APIs. Application artifacts (code, executable, installation packages, and so forth) can be also ingested or referred to via the databases or API's. The APIs or portal user interfaces 340 and 344 can be used to associate or upload requests to match and deploy while also indicating application templates and policies to use, for example. Such APIs and user interfaces can be implemented as part of a designer tool, described previously, to define metadata and associate to infrastructure (e.g., via infrastructure templates and topologies).

Preparation and setup of agent and monitoring tools/can be provided such that applications can discover the instances (which have been instrumented and with agents if needed). This can be achieved via instruction/recipes utilized to deploy infrastructure and application elements after binding the application and its associated components to the infrastructure resources. Events/reports allow closed feedback loops that can be used to scale up/scale out (based on policy) or update context/policies for future changes if allowed by policies as well as notify appropriate parties or systems (See FIG. 4 and description below). As noted above, clouds and resource pools can be hybrid entities where some resources are served locally and some remotely. For clouds or hardware resources that can support auto-scaling, workload management and handling of assurance/monitoring events, the application can be self managed (e.g., utilizes feedback to determine performance, alter execution requirements, and generate alerts if necessary).

Figure 4:
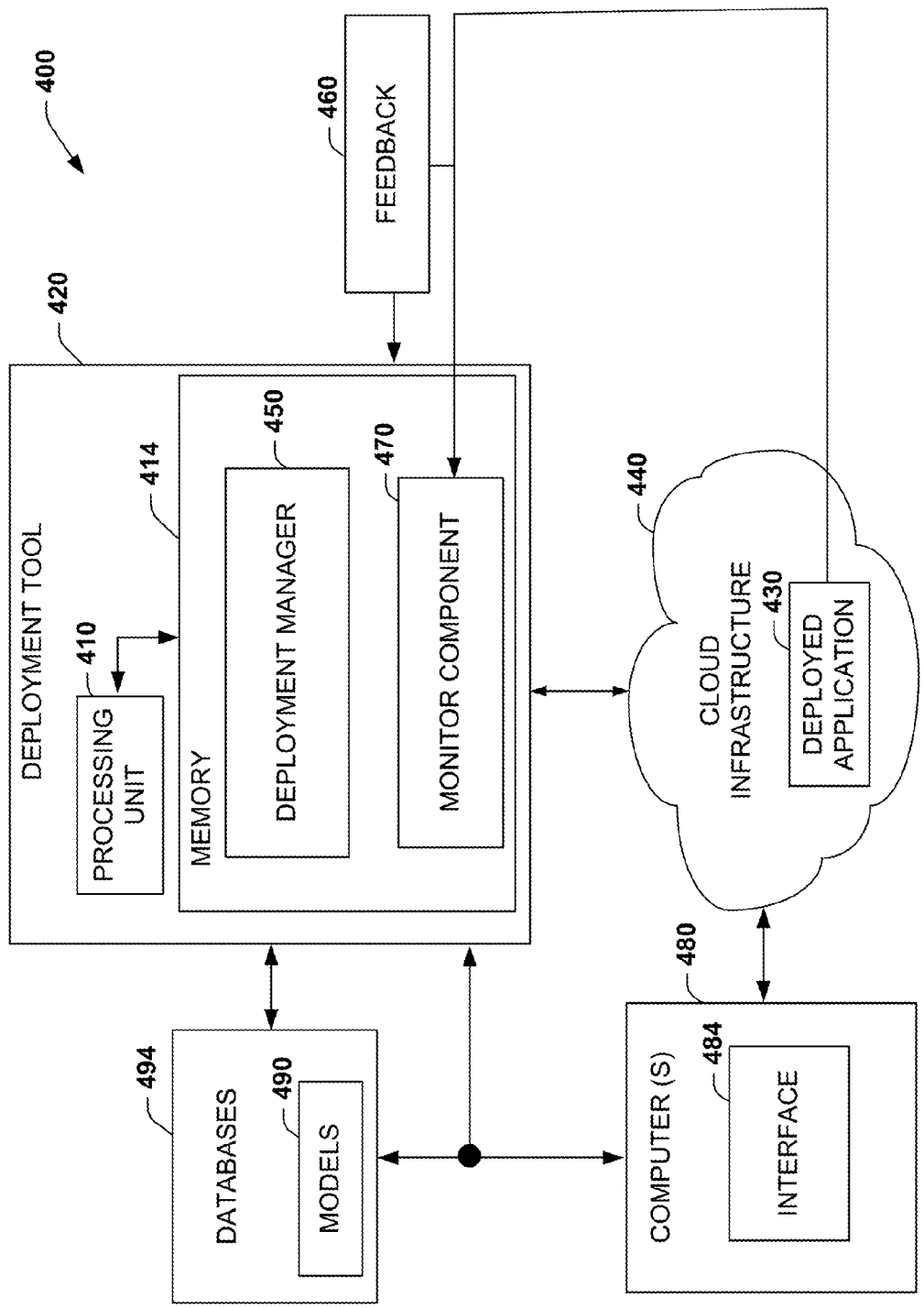
FIG. 4 illustrates an example system utilizing closed loop feedback for deployment and monitoring of applications.

FIG. 4 illustrates an example system 400 utilizing closed loop feedback for deployment and monitoring of applications. The system 400 includes a processing unit 410 (or processor) that executes instructions from a memory 414 that includes firmware or other storage media for storing computer executable instructions associated with a computer. The processing unit 410 and memory 414 can be provided as part of a deployment tool 420 that deploys an application 430 on a cloud infrastructure 440 via a deployment manager 450. As shown, feedback 460 is received from the deployed application 430 and processed by a monitor component 470. Such feedback 460 can be status or events from the deployed application 430 which indicate how the application is executing. In one example, the feedback 460 can be employed to adjust operating parameters of the deployed application 430, which have been set according to previously determined execution requirements. For instance, a foreground task may be adjusted such that the task operates over a differing number of milliseconds than presently being executed. This can include scaling up or down operating requirements of the deployed application 430. In another example, the feedback 460 may be employed to adjust operating infrastructure of the cloud infrastructure 440. For example, service level agreements may be automatically renegotiated with cloud infrastructure service providers to increase or decrease available resources to properly meet operating needs of the deployed application 430.

A computer 480 can operate one or more interfaces 484 to program application models 490 and stored in databases 494. The computer can also interact with the deployment tool 420 to alter deployment and facilitate lifecycle management of applications. The interfaces 484 can also configure infrastructure templates, alter operating requirements, configure the monitor component 470, and interact with events and alerts that are generated within the system 400. As noted previously, along with being executed on the cloud, the deployed application 430 can be spread across unrelated clouds or provided as part of a hybrid application. For example, the deployed application 430 could be executed in part on the cloud infrastructure 440 and in part on the databases 494 which are a different entity (e.g., local server databases versus network databases) than the cloud.

Figure 5:
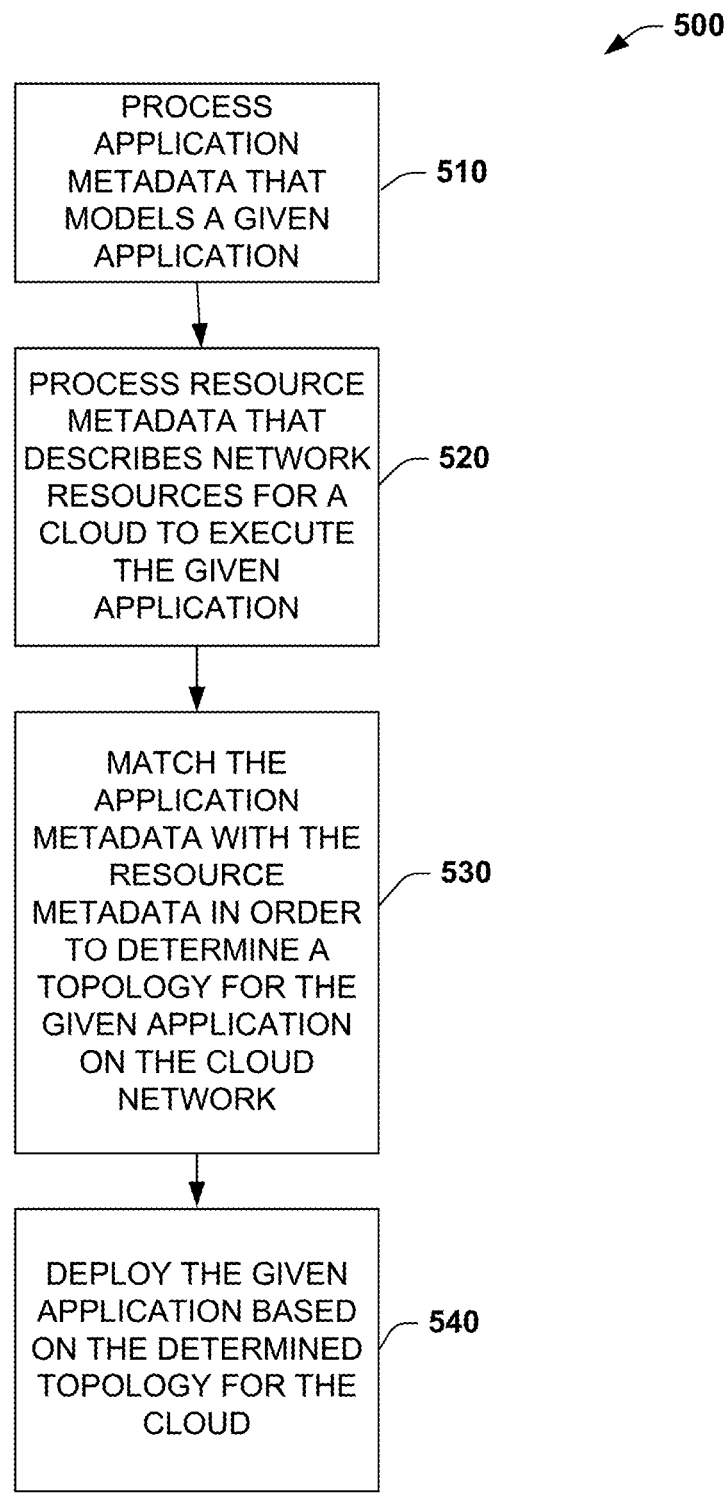
FIG. 5 illustrates a flowchart of an example method for automated deployment of applications.

In view of the foregoing structural and functional features described above, an example method will be better appreciated with reference to FIG. 5. While, for purposes of simplicity of explanation, the example method of FIG. 5 is shown and described as executing serially, it is to be understood and appreciated that the present examples are not limited by the illustrated order, as some actions could in other examples occur in different orders and/or concurrently from that shown and described herein. Moreover, it is not necessary that all described actions be performed to implement a method. The example methods of FIG. 5 can be implemented as machine-readable instructions that can be stored in a non-transitory computer readable medium, such as can be computer program product or other form of memory storage. The computer readable instructions corresponding to the method of FIG. 5 can also be accessed from memory and be executed by a processor (e.g., a processing unit 410 of FIG. 4).

FIG. 5 illustrates an example method 500 for automated deployment of applications. At 510, the method 500 includes processing application metadata that models a given application (e.g., via deployment manager 120 of FIG. 1). The method 500 includes processing resource metadata that describes network resources for a cloud to execute the given application at 520. At 530, the method 500 includes matching the application metadata with the resource metadata to determine a topology for the given application on the cloud. At 540, the method 500 includes deploying the given application based on the determined deployment conditions for the cloud. Although not shown, the method can also include monitoring feedback from the given application (e.g., feedback utilized for scaling up or scaling down resources for the application, starting/stopping application, moving applications, starting remediation or support flows to repair detected issues)).

The method 500 can be automatically executed as part of a system such as the example depicted in FIG. 4. The system can include a memory for storing computer executable instructions associated with a computer and a processing unit for accessing the memory, executing the computer executable instructions, and thereby performing the method 500. The computer executable instructions can include an application model stored in the memory to characterize a given application for deployment on a cloud infrastructure, wherein the application model can be described by application metadata. A deployment manager stored in the memory can analyze the application metadata for the given application and a policy associated with the given application to determine infrastructure resources in the cloud infrastructure. The infrastructure resources can be specified as resource metadata, wherein the deployment manager automatically correlates the application metadata with the resource metadata to fulfill the execution requirement. A monitor component can be implemented with the deployment manager to read feedback from the given application and enable the deployment manager to adjust the given application or the infrastructure resources.

Figure 6:
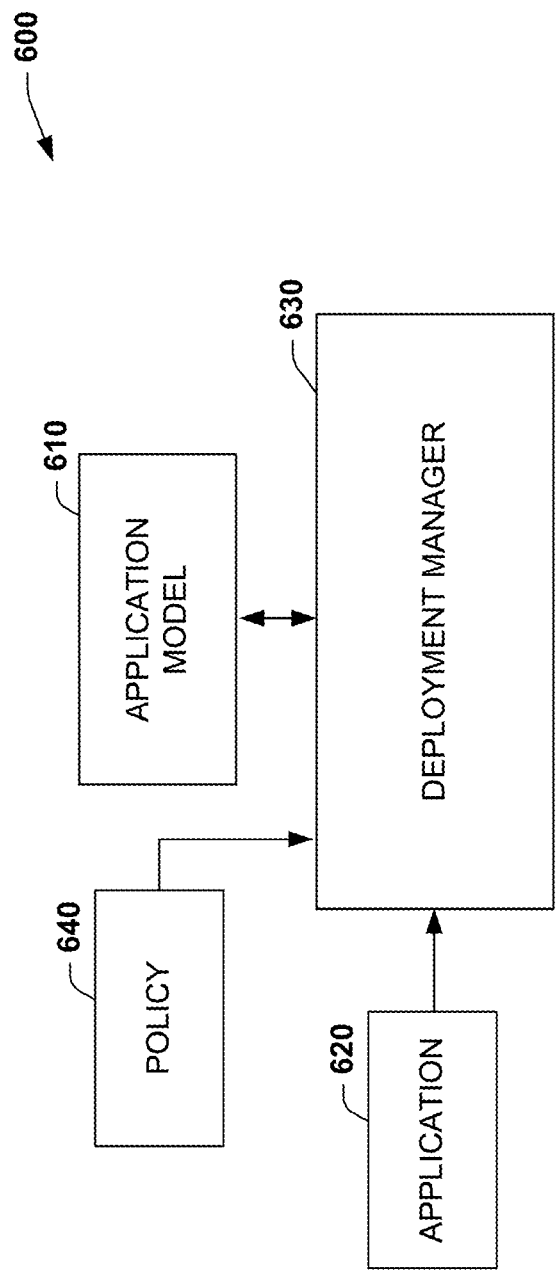
FIG. 6 illustrates an example deployment system for automated deployment of cloud applications.

FIG. 6 illustrates an example deployment system 600 for automated deployment of cloud applications. The system 600 includes an application model 610 to characterize a given application 620 for deployment on a cloud infrastructure such as shown above with respect to FIG. 1. A deployment manager 630 analyzes an execution requirement for the given application 620 based on the application model 610 and a policy 640 associated with the given application to determine infrastructure resources in the cloud infrastructure to fulfill the execution requirement.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A system comprising:
   an application model, stored in memory, to characterize a given application for deployment on a cloud;
   a deployment manager, corresponding to instructions executable by a processor, to analyze an application requirement for the given application based on the application model and policies associated with the given application to substantially match infrastructure resources in the cloud to fulfill the application requirement;
   a monitor component to read feedback from the given application and supply the feedback to the deployment manager: and
   the deployment manager to dynamically adjust the application model based on the feedback by adjusting an operating parameter of the given application.

2. The system of claim 1, wherein the deployment manager is to automatically deploy the given application on the cloud.

3. The system of claim 1, wherein the deployment manager is to generate instructions to inform another system or user on how to deploy the given application on the cloud.

4. The system of claim 1, further comprising a designer tool to define metadata for the infrastructure resources and the application requirement.

5. The system of claim 4, wherein the designer tool defines the application model via application metadata that includes at least one of descriptions of components to be individually deployed, requirements or preferences for resources, or deployment scripts.

6. The system of claim 5, wherein the deployment scripts include at least one of deployment instructions for components, instructions to prepare deployment agents, instructions for monitoring, instructions for management, or instructions that apply across components.

7. The system of claim 4, wherein the infrastructure resources are specified via resource metadata that specifies which resource offerings are available or existing systems that can provision a given service.

8. The system of claim 7, wherein the resource metadata further specifies at least one of a location, a topology, a hardware resource, a maintenance capacity, an operating systems requirement, or a label.

9. The system of claim 1, wherein the deployment manager performs dynamic binding of infrastructure templates and the application model to substantially match the infrastructure resources in the cloud to the given application.

10. The system of claim 1, wherein the deployment manager utilizes the feedback to perform a corrective action or to delegate the corrective action to another module.

11. The system of claim 1, wherein the deployment manager is to dynamically adjust the policies associated with the given application based on the feedback.

12. The system of claim 1, wherein the deployment manager is to retire old versions of application components of the given application and install new versions of the application components.

13. The system of claim 1, wherein the feedback comprises status or events from the given application which indicate how the given application is executing.

14. A method comprising:
    processing, by a computer, application metadata to model a given application;
    processing, by the computer, resource metadata to describe infrastructure resources for a cloud to execute the given application;
    matching, by the computer, the application metadata with the resource metadata to determine a topology for deploying the given application on the cloud;
    deploying, by the computer, the given application in the cloud based on the topology that is determined;
    monitoring feedback from the given application; and
    dynamically adjusting the application metadata based on the feedback by adjusting an operating parameter of the given application.

15. The method of claim 14, further comprising monitoring the feedback from the given application to alter deployment of the given application in the cloud.

16. A system, comprising:
    a memory for storing computer executable instructions associated with a computer; and
    a processing unit for accessing the memory and executing the computer executable instructions, the computer executable instructions comprising:
    an application model stored in the memory to characterize a given application for deployment on a cloud infrastructure, wherein the application model is described by application metadata;
    a deployment manager stored in the memory to analyze the application metadata for the given application and policies associated with the given application to determine infrastructure resources in the cloud infrastructure, wherein the infrastructure resources are specified as resource metadata and the deployment manager automatically substantially matches the application metadata with the resource metadata to fulfill an application requirement specified by the application metadata and the policies associated with the given application;
    a monitor component to read feedback from the given application and supply the feedback to the deployment manager; and
    the deployment manager to dynamically adjust the application model based on the feedback by adjusting an operating parameter of the given application.

17. The system of claim 16, wherein the monitor component is to enable the deployment manager to adjust the given application or the infrastructure resources.

* * * * *